UNITED STATES PATENT OFFICE.

AUGUST ALBERT, OF MUNICH, GERMANY.

DERIVATIVES OF ORGANIC ARSENIC COMPOUNDS.

1,425,929.   Specification of Letters Patent.   Patented Aug. 15, 1922.

No Drawing.   Application filed March 25, 1922. Serial No. 546,792.

*To all whom it may concern:*

Be it known that I, AUGUST ALBERT, a citizen of the Republic of Germany, and residing in Munich, Elisabethstrasse 46, Germany, have invented new and useful Derivatives of Organic Arsenic Compounds, of which the following is a specification.

It is known that the aromatic compounds, containing carbonyl groups, do not respond to certain carbonyl reactions, for instance the bisulphite reaction which otherwise is often used for separating and isolating the aldehyde- and keto-compounds. Also the effort to acetylize these compounds is found to be negative. Even the semi-carbazide reaction does not proceed in many cases, for instance p-benzophenoarsonic acid is indifferent, or is reduced in an undesired manner. Attempts to produce biologically effective hydrazine compounds of the said arsenic derivatives therefore appeared hopeless.

Now I have found that mixed aliphatic aromatic carbonyl arsenic compounds react smoothly with hydrazine and the various hydrazine derivatives without undesirably reducing the carbonyl groups which are known to be reduced easily. This effect could the less be foreseen because the hydrazine compounds are known to possess a very strong reducing effect and it was therefore not to be expected that the desired hydrazine reaction would occur, and also because it was possible that undesirable side reactions would occur.

By the term "mixed aliphatic-aromatic carbonyl arsenic compounds" are to be understood compounds of the class $R_1—C=O—R_2$ in which $R_1$ is hydrogen or any alkyl group or substituted alkyl group, either saturated or unsaturated and $R_2$ is the arsenic or arsonic acid derivative of a simple aromatic radical such as $C_6H_4$ or of a polynuclear or condensed nuclear radical, simple or substituted, carbocyclic or heterocyclic. It is to be especially noted that the carbonyl group may be attached directly to the aromatic nucleus or to a side chain thereof.

As examples of the carbonyl compounds in which the carbonyl group is attached directly to the aromatic nucleus may be menloxy-acetophenon-4-arsonic acid

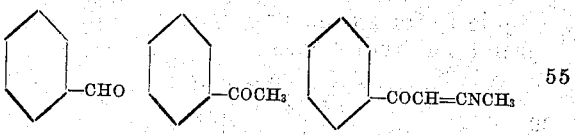

As examples of carbonyl compounds in which the carbonyl group is attached to a side chain of the aromatic nucleus may be mentioned the following:

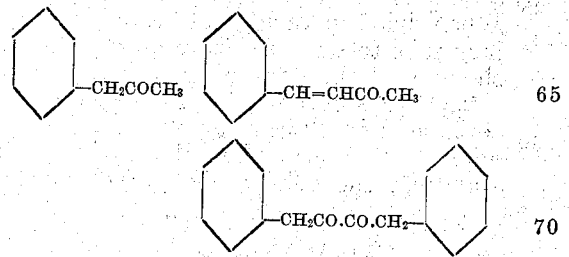

To carry out the desired reaction it is sufficient to mix the reagents in either acid, alkaline or neutral medium. It is easy to determine by trial what medium gives the optimum yield in any partciular case. The hydrazine used may be simple hydrazine, $NH_2—NH_2$, or monosubstituted hydrazine $NH_2—NHR$ or asymmetric disubstituted hydrazine $H_2N—N{<}^{R_1}_{R_2}$ Under $R_1$ and $R_2$ respectively, are understood aliphatic or aromatic or mixed aliphatic aromatic radicals of each kind; or radicals with other hydrazine complexes. In the following are examples for $R_1$ and $R_2$;—

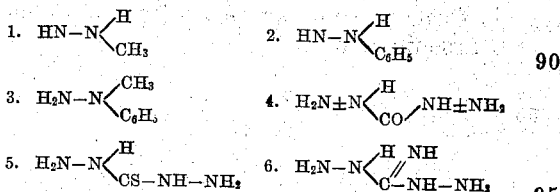

The bodies produced according to the described process are generally well defined and well crystallized bodies which are very effective against bacilli of the most varied sorts for instance *Trypanomiasis*, *Spiro-*

*chaeta pallida* and the like and are found useful in therapeutics.

Examples.

1. 1 gram p-acetophenonarsonic acid

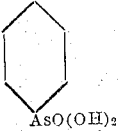

is dissolved in 8 ccm. ½ normal sodium carbonate lye and 1 ccm. of 50% hydrazine hydrate solution is added. After standing quietly for a time, hydrochloric acid is added and the hydrazone

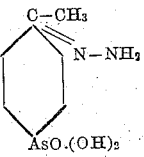

separates as a nearly colorless product. When dried in vacuo and heated in a capillary tube to a temperature above 340° C. it shows a slight darkening without melting.

2. To a solution of 4 g p-acetophenoarsonic acid in 40 ccm. of 50% acetic acid is added 2 ccm. phenylhydrazine. After standing, the yellow phenylhydrazine sep-

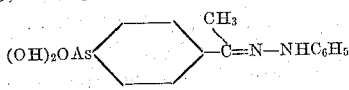

arates. To complete the reaction the mixture is placed for some time on the water bath. The phenylhydrazine may be recrystallized out of glacial acetic acid. It forms light yellow plates which decompose at a temperature of 225°.

3. In the same manner the p-nitrophenylhydrazone of the 1-oxy-2-propionphenon-4-arsonic acid

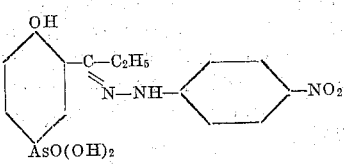

is formed from the 1-oxy-2-propionphenon-4-arsonic acid

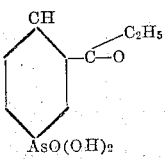

and p-nitrophenylhydrazine. When recrystallized out of acetic acid, clusters of fine pointed yellow needles are produced which decompose at a temperature of 235°.

4. The semicarbazone of the 6 (?)-nitroloxy-acetophenon-4-arsonic acid

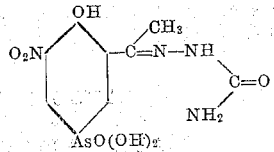

is formed with a good yield by union of the two components, best in weak sodium carbonate solution. The reaction is completed on the water bath. Heated in the capillary tube, it begins to color brown at a temperature above 240° C.

5. 1 part in weight of the p-acetophenonarsonic acid is dissolved in about 7.5 ccm. ½ normal NaOH lye and 0.7 g. aminobiuret are added; the separation begins immediately. Prolonged heating on the water bath is advantageous. The condensation product

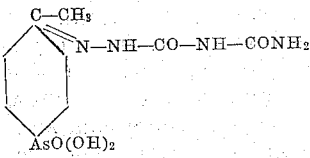

of the aminobiuret may be recrystallized out of a large amount of 20% acetic acid. It forms pointed plates which do not melt below a temperature of 360°, but become a yellowish brown color.

6. The amidoguanidine derivative of the p-acetophenonarsonic acid:

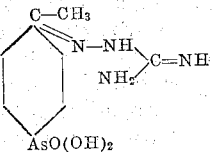

is obtained by addition of 2 parts of amidoguanidin nitrate (by weight) to a solution of 5 parts of arsonic acid in 30 ccm. of normal sodium carbonate solution after a short heating. By careful addition of diluted hydrochloric acid the amidoguanidin derivative separates out in crystals. It is soluble in dilute acids in the cold. Heated in the capillary tube, the substance gently decomposes at a temperature higher than 300°.

7. The corresponding semicarbazone

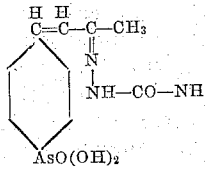

is formed in good yield out of p-benzacetone-arsonic acid

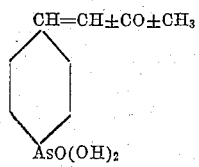

and semicarbazidechlorhydrate in hot aqueous solution. It is colored intensely yellow, crystallizes in thick needles and decomposes when heated in the capillary tube above a temperature of 330° C. and turns brown.

8. If to an aqueous solution of p-benzaldehydarsonic acid:

the theoretical quantity of asymmetric diethylhydrazine is added, the diethylhydrazone

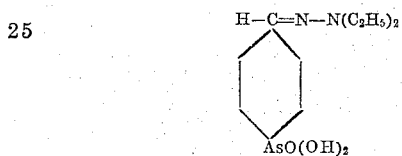

separates on heating as an oil and crystallizes in the cold. When recrystallized out of aqueous alcohol it melts with slow decomposition at 140°. The diethylhydrazone may be dissolved in diluted hydrochloric acid.

9. 4 parts by weight of p-benzaldehydarsonic acid in glacial acetic acid solution are heated for some time on the water bath with 4 parts by weight of crude asymmetric methylphenyl hydrazine, the red-brown solution is rapidly evaporated on the water bath after which the addition of water and diluted hydrochloric acid produces crystallized methylphenylhydrazone:

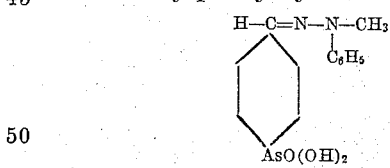

Recrystallized out of aqueous acetic acid, the product forms yellow feather shaped masses of needles which melt at a temperature of about 295° with strong decomposition.

10. Example for a trivalent arsenic compound: 0.5 grams 1-arseno-3-oxy-4-methylephenylketone are stirred with 5 ccm. double normal NaOH. Water is added until the substance is completely dissolved and then 0.3 grams semicarbazidhydrochloride are added. The solution is heated for half an hour on the water bath, preferably with limited contact with air or the solution is left standing a longer time at ordinary temperature and cooled. After addition of dilute hydrochloric acid, the light yellow product is filtered with suction, washed and dried in vacuo, whereby it becomes colored, sometimes light brown. The dry product is soluble in NaOH solution. The boiling points vary according to the method of heating.

11. 0.5 grams p-acetophenon-arsonic acid are dissolved in 4 ccm. ½ normal NaOH (about 1 mol. NaOH) or sodium carbonate and to the clear solution ½ mol. carbohydrazide —0.1 g. is added. The transformation begins in the cold. It is suitable to let the solution stand for 24 hours and then to separate the white crystalline carbohydrazide derivatives by means of 2 ccm. normal hydrochloric acid, from the clear solution. It may be heated almost unchanged in a capillary tube to 360° C. It shows the well known magnesia reaction of the arsonic acids in concentrated ammoniacal solution even in the cold.

12. 0.5 grams p-acetophenonarsonic acid are dissolved as above mentioned and then 0.13 grams malonylhydrazide added to the solution. The transformation is accelerated by heating for a short time on the water bath. To complete the reaction the solution should stand for a few hours at ordinary temperature and then the hydrazone is separated with 2 ccm. HCl. Heated to about 360° C., it shows little change.

13. 0.5 grams p-acetophenon-arsonic acid are dissolved and 0.12 grams oxalylhydrazide added. After heating half an hour on the water-bath, the reaction is nearly complete. After standing for a few hours at ordinary temperature, a little unreacted oxalylhydrazide separates, which is separated from the solution by suction. The hydrozone is separated by acid from the mother liquor. It does not melt below 300° C.

Claims:

1. As a new composition of matter, an arseno hydrazone of the type

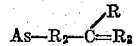

in which As represents pentavalent arsenic, R represents hydrogen or an alkyl group, $R_2$ represents a phenyl group, and $R_3$ represents a group containing a hydrazine nucleus.

2. As a new composition of matter, the hydrazone of methyl, phenol ketone having an arsonic acid group attached to the aromatic nucleus.

AUGUST ALBERT.

Witnesses:
 ALEXANDER DE SOTO,
 ALEXA V. PHILIPPOFF.

Certificate of Correction.

It is hereby certified that in Letters Patent No. 1,425,929, granted August 15, 1922, upon the application of August Albert, of Munich, Germany, for an improvement in "Derivatives of Organic Arsenic Compounds," errors appear in the printed specification requiring correction as follows: Page 1, line 41, for the word "arsenic" read *arsinic*, and lines 44 and 45, for the misspelled word "heretocyclic" read *heterocyclic;* same page, strike out line 52 and insert the syllable and words *ioned the following;* and line 92, page 1, and line 1, page 3, in the formulas, for the sign ± read —; page 2, line 55, in the formula, strike out the dash between C and O and insert a double bond; and that the said Letters Patent should be read with these corrections therein that the same may conform to the record of the case in the Patent Office.

Signed and sealed this 10th day of October, A. D., 1922.

[SEAL.]                          WM. A. KINNAN,
*Assistant Commissioner of Patents.*